United States Patent
Sang et al.

(10) Patent No.: US 7,839,830 B2
(45) Date of Patent: Nov. 23, 2010

(54) UPLINK SCHEDULER FOR CELLULAR PACKET ACCESS

(75) Inventors: Aimin Sang, Palo Alto, CA (US); Xiaodong Wang, New York, NY (US); Mohammad Madihian, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 911 days.

(21) Appl. No.: 11/690,936

(22) Filed: Mar. 26, 2007

(65) Prior Publication Data
US 2007/0248035 A1    Oct. 25, 2007

Related U.S. Application Data

(60) Provisional application No. 60/744,627, filed on Apr. 11, 2006.

(51) Int. Cl.
*H04B 7/212* (2006.01)
(52) U.S. Cl. .................. 370/337; 455/452.2
(58) Field of Classification Search .......... 370/337; 455/450–454
See application file for complete search history.

(56) References Cited

U.S. PATENT DOCUMENTS 6,845,246 B1 * 1/2005 Steer ..................... 455/522
7,158,804 B2 * 1/2007 Kumaran et al. .......... 455/515
2002/0102983 A1 * 8/2002 Furuskar et al. .......... 455/452

OTHER PUBLICATIONS

Rajkumar et al., 1998, Practical Solutions for QoS-based Resource Allocation Problems, IEEE Real-Time Systems Symposium.*

* cited by examiner

*Primary Examiner*—Lester Kincaid
*Assistant Examiner*—Steven Lim
(74) *Attorney, Agent, or Firm*—James Bitetto; Joseph Kolodka

(57) ABSTRACT

A method includes constraining total power received from cellular users accessing a base station through any one of a TDMA access, CDMA access, and a derivation of a TDMA/CDMA access, and scheduling users for access to the base station within the constrained total power in response to an optimization that for each time slot determines a group of time critical cellular users and their transmission power factoring in instantaneous location-dependent channel states and long term quality of service performance. In the preferred embodiment, the optimization includes an iterative solution of an NP-hard Knapsak problem with initialization of maximum transmit power per cellular user inversely proportional to at least one of an activity factor of a cellular user's channel, the cellular user's antenna gain, the instantaneous channel gain of a dedicated uplink channel for the cellular user, and other-cellular user to same-cellular user interference ratio, and directly proportional to total resource power consumption.

4 Claims, 10 Drawing Sheets

| Real-time services | System efficiency | Per-user QoS | | Aggregate QoS, and resource consumption | | |
|---|---|---|---|---|---|---|
| | Goodput /power | loss | goodput/ profileRate | RoT (energy) | loss | goodput |
| TDMA (T-wAlphaRule) | best (highest) | poor (high) | poor (low) | good (good) | poor | poor (low) |
| CDMA (ER-CDMA) | worst (lowest) | best (low) | best (high) | good (poor) | best | best (high) |
| TDMA/CDMA (T/C-wPF) | good (high) | best (low) | best (high) | good (good) | ~best | ~best (high) |
| TDMA/CDMA (T/C-wMaxC/I) | medium | poor (high) | worst (lowest) | good (good) | worst | worst (lowest) |

FIG. 9

| | |
|---|---|
| Initialization set $L^*(t) = 1 - \frac{1}{Z_{in}}$; $I(t)$ =NULL; and: $$p_i^{max} = \overline{p}_i^{max} \equiv \min\left\{p_i^{max}, \frac{\frac{L^*(t)}{1-L^*(t)} N_0 W}{(1+f)G_{dv}G_a h_i(t)}\right\}.$$ | |
| i) $\forall i$ (backlogged users), letting $l_i(t) = l_i^{RoT}(t) \equiv (1 - L^*(t))(1+f)G_{dv}G_a \frac{\overline{p}_i^{max} h_i(t)}{N_0 W}$; | |
| ii) sorting $i$'s into a list $U$ with decreasing $u_i^{RoT}(t) = \frac{w_i(t)}{B_i(t)^\alpha} W \log_2\left(1 + \frac{1}{G_{dv}G_a} \frac{l_i^{RoT}(t)}{(1+f) - (1+f-\phi)l_i^{RoT}(t)}\right)$; | |
| iii) moving the first user $i$ from $U$ into $I(t)$, calculating $i$'s (interference-free) SINR $s_i(t, I)$ (see below for the equation) and utility increment $u_i(t, I)$ (see below) | |
| iv) removing the next user $k$ from $U$ and letting $I'(t) = I(t) + \{k\}$, then proceeding to check whether $I'(t)$ offers better utility than $I(t)$ below under RoT and $s_i^{min}$ ($\forall i \in I'(t)$) constraints. | |
| v) calculating $I'(t)$-defined SINR as follows: $$s_i(t, I') = \frac{\overline{p}_i^{max} h_i(t)}{N_0 W + (1+f)G_{dv}G_a \sum_{k \in I'(t), k \neq i} \overline{p}_k^{max} h_k(t) + \phi G_{dv}G_a \overline{p}_i^{max} h_i(t)}, \forall i \in I'(t);$$ | |
| vi) checking if $\exists i \in I'(t)$, $s_i(t, I') < s_i^{min}$, and if yes, going back to the previous step, otherwise proceeding to the next step; | |
| vii) $\forall i \in I'(t)$, calculating $I'(t)$-defined per-user load and utility increment as follows $$l_i(t, I') = \frac{(1+f)G_{dv}G_a s_i(t, I')}{1 + (1+f-\phi)G_{dv}G_a s_i(t, I')},$$ $$u_i(t, I') = \frac{w_i(t)}{B_i(t)^\alpha} W \log_2(1 + s_i(t, I')).$$ | |
| viii) calculating $L(t) = 1 - \frac{1}{(1+\delta)Z_{th}} - \sum_{\forall i \in I'(t)} l_i(t, I')$. If $L(t) < 0$ or $\sum_{\forall i \in I'(t)} u_i(t, I') < \sum_{\forall i \in I(t)} u_i(t, I)$, and if $U \neq$ NULL, then going back to step iv). | |
| ix) adding $k$ to $I(t)$: $I(t) = I'(t)$, $L^*(t) = L(t)$. If $U =$ NULL, stop with scheduling decision as $\{p_i(t) = \overline{p}_i^{max} 1_{(i \in I(t))}, \forall i \in K\}$; otherwise, going back to Step iv). | |

Fig. 10

UPLINK SCHEDULER FOR CELLULAR PACKET ACCESS

BACKGROUND OF THE INVENTION

This non-provisional application claims the benefit of U.S. Provisional Application Ser. No. 60/744,627, filed on Apr. 11, 2006 entitled "Real Time Scheduler Design for Enhanced 3G Cellular Uplink Packet Access" the contents of which hereby incorporated by reference herein.

The present invention relates generally to cellular communications, and more particularly, to real time uplink scheduling for real time packet services in third generation (3G) and beyond cellular systems.

The third-generation (3G) cellular systems, e.g., CDMA2000 1xEV-DO.A, described in the 3gpp Technical Specification 25.309 version 6.3.0, "FDD enhanced uplink, overall description, Stage 2", June 2005 and the writing by M. Andrews, K. Kumaran, K. Ramanan, A. Stolyar, P. Whiting, and R. Vijayakumar, "Providing quality of service over a shared wireless link", IEEE Commun. Mag., pages 150-154, February 2001", and WCDMA Release 6 High Speed Uplink Packet Access (HSUPA) or Enhanced Dedicated Channel (E-DCH) described in ITU-T Recommendation H.263, "Video Coding for Low Bitrate Communication, 1996", were recently standardized to meet an increasing demand for high-speed packet uplink services from mobile cellular users. Both systems adopt base station-based Hybrid ARQ (HARQ) retransmission and scheduler over dedicated, time-slotted CDMA code channels for mobile users (MSs). Multiple mobile users MSs access the base station (BS) through a media access control (MAC)-layer scheduling approach.

The 3G cellular system 1xEV-DO.A allows a hybrid of centralized and distributed control of MAC, while HSUPA has a corresponding approach, namely relative grant (RG), and also a centralized approached, named absolute grant (AG), to schedule mobile users MSs uploading slot by slot. In contrast to the scheduler adopted in 1xEV-DO.A, where BS considers MSs' requests and system's loads to control deterministically and the current rates of all MSs in a differential manner (UP/DOWN/KEEP), the centralized AG scheduler at the serving BS grants explicit rate to each MS on basis of their report of traffic volume measurement (TVM), power headroom, and quality of service (QoS) states. The AG scheduler may thus have more control flexibility and responsiveness to bursty and real-time packet services, such as MPEG4 or H.263 encoded video uploading. See the references, E. Esteves, "On the reverse link capacity of CDMA2000 high rate packet data systems", in Proc. IEEE Int. Conf. Commun. (ICC), pages 1823-1828, April-May 2002 and F. Fitzek and M. Reisslein, "MPEG-4 and H.263 video traces for network performance evaluation", IEEE Networks Mag., 15(6), November/December 2001. A focus of the invention is a scheduler for real-time (RT) AG services at the serving cell.

There have been intense research activities in the field of uplink scheduling over synchronous or asynchronous CDMA systems. As mentioned above, the 3G cellular system, 1xEV-DO.A, see P. Tinnakornsrisuphap and C. Lott, "On the fairness of the reverse-link MAC layer in CDMA2000 1xEV-DO", In Proc. IEEE Int'l Commun. Conf. (ICC), Paris, France, June 2004, adopted a pure CDMA approach with equal SINR among active users. Explanation of the invention further below will show that the equal-rate CDMA (ER-CDMA), a centralized version of 1xEV-DO.A's approach that also presents optimal performance bounds, fails to exploit multiuser diversity gain and therefore delivers low performance and especially low efficiency (in bits/s/watt).

Very recently P. T. Kabamba, S. M. Meerkov, and C. Y. Tang, in their work entitled, "Ranking and adaptive ranking cdma", IEEE/ACM Trans. on Networking, 13(3):622-635, June 2005, (hereinafter Kabamba et al), proposed ranking and adaptive ranking CDMA (R-CDMA or AR-CDMA) approaches to minimize the summed mean power consumption among all mobile users MSs, where at each time slot an optimal group of n out of N mobile users MSs is selected based on a sorted list of (normalized) per-user channel quality. All active users transmit with an equivalent (and feasible) received signal-to-interference-and noise-ratio SINR. In contrast to the legacy purely CDMA scheme, referred to as constant SINR CDMA (C-SINR-CDMA) in the paper by Kabamba et al., AR-CDMA and R-CDMA are actually hybrid TDMA/CDMA approaches with and without location-aware fairness, respectively. It remains to be seen how they may perform if given delay-sensitive applications, per-user constraints of transmission power, and the RoT upper bound. In addition, the imposed requirement of equal signal-to-interference plus noise ratios (SINRs) among active MSs at each time slot need further justification, especially when the uplink traffic pattern is bursty, e.g., variable-bit-rate videos.

As referred in Kabamba et al., SINR-threshold based uplink scheduling approaches, see S. W. Kim and A. J. Goldsmith entitled, "Truncated power control in code-division multiple-access communications", IEEE Trans. Veh. Technol., 49(3):965-972, May 2000, and by S. W. Kim and Y. Lee, entitled "Combined rate and power adaptation in DS/CDMA communications over nakagami fading channels", IEEE Trans. Commun., 48(1):162-168, January 2000, which turn off poor-channel users and enable strong-channel users to transmit with equal received SINRs or fixed transmission power, suffer from location-dependent service unfairness. In addition, it is very difficult to decide a reasonable channel threshold in practice. Both approaches are TDMA/CDMA hybrid.

Other important work in hybrid TDMA/CDMA scheduling includes that by K. Kumaran and L. Qian, entitled "Uplink scheduling in CDMA packet-data systems", In Proc. IEEE INFOCOM, pages 292-300, April 2003, (hereinafter Kumaran et al.), and by S.-J. Oh, T. L. Olsen, and K. Wasserman, entitled "Distributed power control and spreading gain allocation in cdma data networks", In Proc. IEEE INFOCOM, pages 379-385, Tel Aviv, Israel, April 2000, (Oh et al.). Both these works were trying to maximize the summation of weighted throughput of all MSs at each time slot. Per-user received power at the BS is constrained. Following Oh et al. and Kumaran et al. shows that the problem is to maximize a convex function at each time slot under linear constraints, where the optimal solution is the full-power transmission by an optimal subset of active MSs. Analysis in Kumaran et al. shows that the optimal solution is actually purely CDMA when the per-user power limitations are severe, or TDMA when the limitations are removed. However, as an NP-hard problem, it can only be approximately solved in polynomial time by heuristic approaches, such as the greedy QPR process, see Kumaran et al., that chooses a single "strong" user (with small power), or a group of "weak" users (with large power and high traffic backlog or "weight"). Based on the same heuristics, Kumaran et al. also proposed an uplink proportional fair (UPF) scheme, a simple modification of proportional fair (PF), see A. Jalali, R. Padovani, and R. Pankaj, "Data throughput of CDMA-HDR a high efficiency-high data rate personal communication wireless system", In Proc. IEEE Veh. Tech. Conf. (VTC), pages 1854-1858, May 2000 (hereinafter Padovani et al.) and P. Viswanath, D. N. C. Tse, and R. Laroia, entitled, "Opportunistic beamforming using dumb antennas", *IEEE Trans. Inform. Theory,* 48(6):1277-1294, June 2002 (hereinafter Viswanath et al.), disclosed an process for downlink scheduling, to maximize (weightless) summation of users' throughput by encouraging simultaneous transmission of "weak" users.

There has been extensive work on downlink scheduling. However, uplink scheduling over multi-access channels differs significantly from its downlink counterpart over a shared broadcast channel. It is well known that for non-real-time (NRT) data services, resource fairness and aggregate system throughput are the most important concerns. Existing NRT downlink scheduling processes, such as max-C/I, see R. Knopp and P. A. Humblet, entitled "Information capacity and power control in single cell multiuser communications", In *Proc. IEEE Int. Conf. Commun. (ICC)*, pages 331-335, June 1995 (hereinafter Humblet et al.), proportional fair PF, see Padovani et al., and Viswanath et al, as well previous work, the Weighted Alpha-Rule (wAlpha-Rule), see A. Sang, X. Wang, M. Madihian, and R. D. Gitlin, "Downlink scheduling schemes in cellular packet data systems of multiple-input multiple-output antennas", In *Proc. IEEE GLOBECOM*, Dallas, Tex., November 2004, an extended version in IEEE Trans. Wireless Commun., Vol. 5, No. 1, January 2006, (hereinafter Sang et al.—Downlink Sheduling . . . ), are all TDM based. Namely they schedule one user per time slot. All schemes focus on channel state exploitation under the assumption of infinite data backlog. Note that the (resource) fairness becomes a secondary issue in RT services.

On the other hand, existing RT downlink scheduling processes for 3G and Beyond cellular systems, such as the modified largest-weighted delay first (M-LWDF), see 3gpp2 C.S20024-A V1.0.CDMA2000, *"High Rate Packet Data Air Interface Specification"*, March 2004 (hereinafter 3gpp2-March 2004), the exponential rule (Exp-Rule), see S. Shakkottai and A. Stolyar, "Scheduling processes for a mixture of real-time and non-real-time data in HDR", In *Proc. 17th Int. Teletraffic Congress (ITC-17)*, September 2001, and Applicants proposed approaches rt-MCD and nrt-MCD, see A. Sang, X. Wang, and M. Madihian, entitled *"QoS-Aware Channel-Dependent Scheduling over A Third-Generation (3G) Cellular Shared Downlink Channels"*, April 2005, Technical Report 2005-L049, NEC Labs America (hereinafter Sang et al.—QoS-Aware Channel Dependent Scheduling . . . ), consider both RT packet delay and multiuser diversity gain. However, they are again TDM-based.

The relative grant RG scheduler in WCDMA or the scheduler in 1xEV-DO.A, see P. Tinnakornsrisuphap and C. Lott, "On the fairness of the reverse-link MAC layer in CDMA2000 1xEV-DO", In *Proc. IEEE Int'l Commun. Conf. (ICC)*, Paris, France, June 2004, assumes perfect power control with pilot channel for fixed target signal-to-interference plus noise ratio SINR of each mobile user MS, see M. Andrews, K. Kumaran, K. Ramanan, A. Stolyar, P. Whiting, and R. Vijayakumar, "Providing quality of service over a shared wireless link", *IEEE Commun. Mag.*, pages 150-154, February 2001. They impose simultaneous transmission of all backlogged mobile users MSs over their orthogonal CDMA code channels. However, such a scheme, though optimized for low-rate voice services, typically causes serious interference among users.

Accordingly, there is a need for an uplink scheduler that improves on prior work to provide improved access by cellular users in 3G cellular and beyond.

SUMMARY OF THE INVENTION

In accordance with the invention, a method includes constraining total power received from cellular users accessing a base station through any one of a TDMA access, CDMA access, and a derivation of a TDMA/CDMA access, and scheduling users for access to the base station within the constrained total power in response to an optimization that for each time slot determines a group of time critical cellular users and their transmission power factoring in instantaneous location-dependent channel states and long term quality of service performance. In the preferred embodiment, the optimization includes an iterative solution of an NP-hard Knapsak problem with initialization of maximum transmit power per cellular user inversely proportional to at least one of an activity factor of a cellular user's channel, the cellular user's antenna gain, the instantaneous channel gain of a dedicated uplink channel for the cellular user, and other-cellular user to same-cellular user interference ratio, and directly proportional to total resource power consumption.

In another aspect of the invention, an apparatus includes a total power limit for receiving transmissions from cellular users through any one of a TDMA access, CDMA access, and a derivation of a TDMA/CDMA access, and a scheduler for selecting access by the cellular users to a base station within the total power in response to an optimization that for each time slot determines a group of time critical cellular users and their transmission power factoring in instantaneous location-dependent channel states and long term quality of service performance. In an exemplary embodiment, the optimization includes an iterative solution of an NP-hard Knapsak problem with initialization of maximum transmit power per cellular user inversely proportional to at least one of an activity factor of a cellular user's channel, the cellular user's antenna gain, the instantaneous channel gain of a dedicated uplink channel for the cellular user, and other-cellular user to same-cellular user interference ratio, and directly proportional to total resource power consumption.

BRIEF DESCRIPTION OF DRAWINGS

These and other advantages of the invention will be apparent to those of ordinary skill in the art by reference to the following detailed description and the accompanying drawings.

FIG. 9 is of a table showing qualitative performance comparisons of uplink scheduling processes in enhanced 3G cellular systems; and FIG. 10 is a table of the iterative process for the inventive scheduler for base station access by multiple cellular user's through any one of a TDMA access, CDMA access and a derivation of TDMA/CDMA acess.

DETAILED DESCRIPTION

Figure 1:
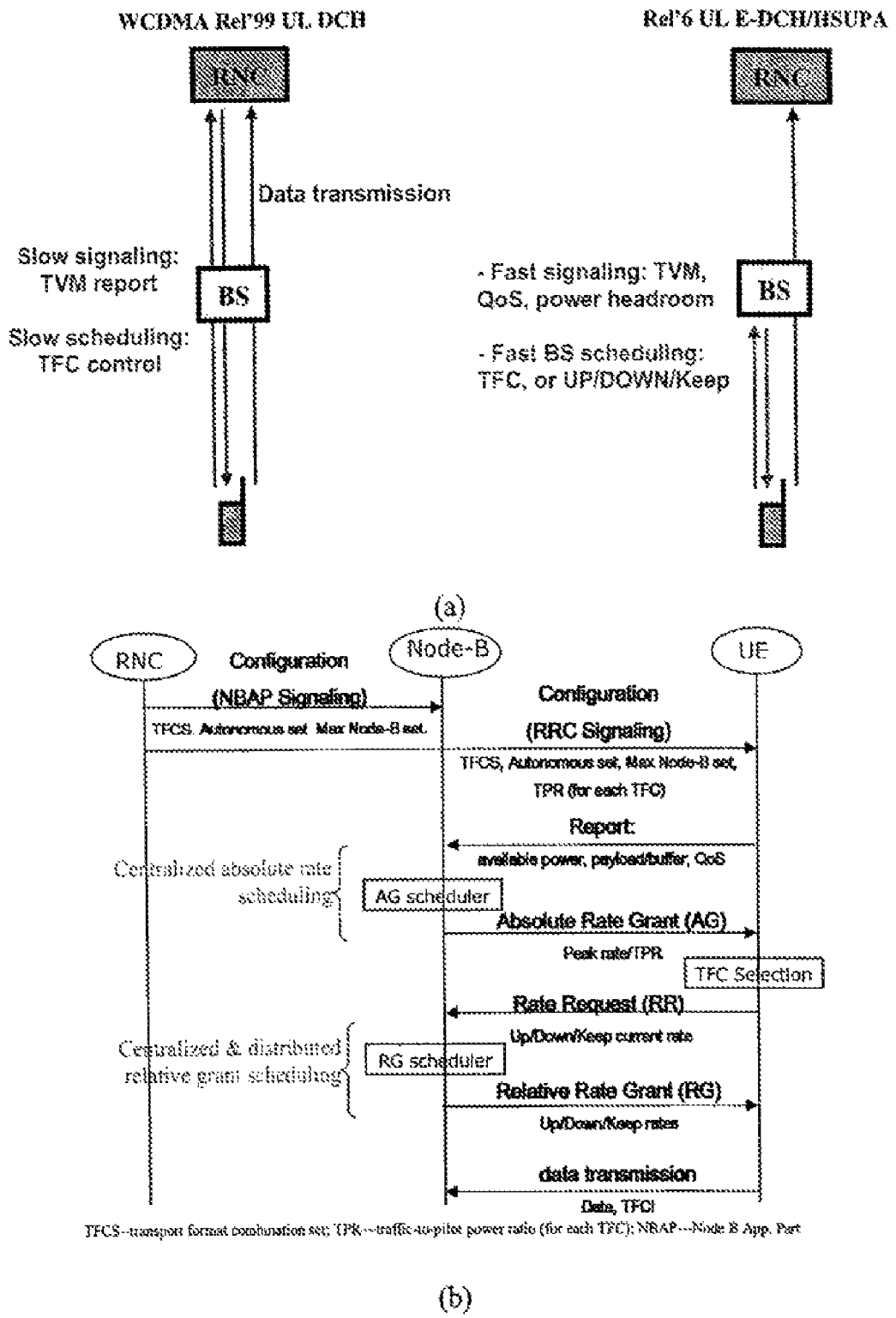
FIG. 1 shows diagrams of WCDMA cellular uplink systems: (a) Migration from WCDMA Release 99 to Release 6, (b) Signaling structures of RG and AG scheduling.

The invention is directed to a centralized uplink scheduling framework in which several processes are considered for real-time packet services in the Third-Generation (3G) and beyond cellular systems. In cells of such systems, multiple users may access the base station through code-division multiple access (CDMA), time-division multiple access (TDMA), or their hybrid. Each user has limited transmission power. The total received power, at the base station from all users, is constrained by an upper threshold of Rise-over-Thermal (RoT). An analysis shows that given each user's information, such as instantaneous channel state, power headroom, and traffic backlog, a centralized TDMA/CDMA-hybrid scheduler may balance efficiently between power consumption, goodput or effective throughput, and packet delay or losses. Compared with purely TDMA or CDMA schedulers, the inventive hybrid scheduler delivers higher goodput (in bits/s) or higher efficiency (in bit/s/watt). The inventive scheduler is derived from utility maximization, a commonly used formulation skill in networking economics and an NP-hard Knapsack problem, and can be approximately solved by heuristic approaches.

In contrast to the RG scheduler in WCDMA or the scheduler in 1xEV-DO.A of the prior art, the invention is advantageous by selecting a group of good-channel or time-critical MSs at each time slot, i.e., taking a hybrid TDMA/CDMA approach, so the absolute grant AG scheduler may reduce the interference and power consumption, exploit the multi-user diversity gain, and eventually provide better performance and higher efficiency. For each slot the invention determines the set of mobile users MSs to transmit and also their transmission power. By exploiting cross-layer information, e.g., instantaneous location-dependent channel states and long-term QoS performance, the invention's centralized AG scheduler is both delay (QoS)-aware and channel-dependent.

The following performance metrics are adopted for the description of the performance of the inventive uplink scheduler for cellular packet access. The first important metric is the per-user goodput (in kbps), referring to the transmission rate of real-time packets delivered successfully before the deadline. In other words, the loss ratio of real-time packets refer to the percentage of packets dropped at the base station due to deadline-expiry or delay violation. The second important metric is the mean power consumption (in watts) or efficiency (in kbps/watt), which indicates the estimated lifetime of a mobile user's MS's battery under the corresponding scheduling schemes. Finally, the mean delay (in sec) and jitter of successfully delivered real-time packets is considered. It is also noted that the above metrics are also measured for all users in aggregation to reflect the system performance.

The description of the invention is organized as follows. The System Description section introduces the cellular system with RT mobile users. The Delay-Aware Scheduling Framework section formulates the uplink scheduling framework into a unified utility optimization problem, and presents different processes in different scenarios. The Hybrid TDMA/CDMA Scheduler section describes a greedy approach and its solution steps to solve the NP-hard Knapsack optimization problem. The Related Work in Uplink Packet Scheduling section describes the differences and advantages of the inventive hybrid TDMA/CDMA scheduler and the prior art. The Performance Evaluations section, consisting of subsections: 1. Goodput Performance, 2. Packet Loss and Delay, 3. Power Consumption and Goodput/Power Efficiency and 4. RoT Resource Consumption and Access Fairness, provides extensive simulation results to evaluate the inventive cross-layer technique, and to compare them with the prior art.

System Description

Referring to FIG. 1(*a*), there is shown an a schematic comparison between uplink cellular systems for WCDMA Release 99 and Release 6, where the base station BS in Release 6 takes over much intelligence from radio network controller (RNC) in Release 99 to control MSs; at each time slot t, the real time RT scheduler picks a set of user I(t) with traffic backlogged from all existing users, denoted by K={1, ..., k, ..., K}, based on the QoS and queuing information of backlogged packets, e.g., the head-of-line (HOL) packet delay or weight of each mobile user MS $\{w_k(t)\}$, the transmit power headroom $\{p_k^{max}(t)\}$, and the instantaneous channel gain $\{h_k(t)\}$ of all users. If at any time slot t, I(t) equals K or the whole set of backlogged users, the scheduler is called purely CDMA. If I(t) refers to a single user k*(t) at any t, the scheduler is purely TDMA. Otherwise it is TDMA/CDMA hybrid.

In HSUPA or 1xEV-DO.A, the dedicated pilot channel for each MS is power controlled to have constant received power $P_p$ at the BS. Therefore, at each time slot the scheduler can control each MS's uplink transmission rate or its transmission power for the data channel by controlling its traffic to pilot ratio (TPR) $z_k(t)$, i.e., the ratio of the power of Enhanced Dedicated Physical Data Channel (E-DPDCH) over Enhanced Dedicated Physical Control Channel (E-DPCCH) in HSUPA. The scheduler at the BS can issue deterministic commands to make differential changes (UP/DOWN/KEEP) to current rate of each MS (or UE), e.g., the RG scheduling in FIG. 1(*b*). Or it can explicitly control the rate or TPR of the MS, e.g., the AG scheduling in FIG. 1(*b*). By 3GPP/3GPP2 standards, only the serving BS in an active set can do AG control, while the non-serving BS can only control the MS to DOWN/KEEP its rate. An MS will combine the commands it received so that DOWN always precludes UP/KEEP. As mentioned earlier, 1xEV-DO.A currently supports only CDMA scheduling like AG, while HSUPA supports both. Our focus is on the absolute grant AG scheduler design for real-time services.

Below are summarized the system and QoS parameters used later as follows:

$h_k(t)$: the instantaneous channel gain of the dedicated uplink channel for user k at time t. In this paper $h_k(t)$ includes factors such as Log-Normal shadow-fading, Rayleigh fading, and path loss.

$p_k(t)$: the actual transmit power for k's data channel at time t.

$z_k(t)$: the TPR of user k at time t.

$P_k(t)$: the received data channel power at the BS from user k at time t.

Therefore, $P_k(t)=z_k(t)P_p=p_k(t)h_k(t)$, where $P_p$ is the received pilot channel power, a constant value by assumption.

$N_0 W$: total received power (in watts) for Gaussian white noise over a spectral spread of bandwidth of W (in Hz).

$G_{dv}$: the activity factor of data or voice channel. Following the work by R. Padovani, "Reverse link performance of is—95 based cellular systems", *IEEE Personal Commun. Mag.*, pages 28-34, 3rd Quarter 1994 (hereinafter, Padovani's Reverse Link performance paper), $G_{dv}=1$ for data and 0.4 for voice.

$G_a$: antenna gain. Following the work by N. Bhushan, C. Lott, P. Black, et al, "CDMA2000 1xEV-DO revision A: A physical layer and mac layer overview", *IEEE Commun. Mag.*, pages 70-77, February 2006 (hereinafter, Bhushan's physical layer/mac overview paper), $G_a=0.948$ for a 3-sector cell.

$\phi$: orthogonality factor in one cell due to multi-path. In this paper, set $\phi=0.01$.

f: other-cell to same-cell interference ratio ($I_{oc}/I_{sc}$). Following Padovani's Reverse Link performance work, f=0.55 (In Bhushan's physical layer/mac overview paper, f is a Lognormally distributed random variable).

$I_t(t)W$: total received same-cell "interference" power (in watts) at the BS, i.e., $$I_t(t)W = I_{oc}W + I_{sc}W = (1+f) \sum_{k \in I(t)} G_{dv}G_a p_k(t)h_k(t),$$

where $I(t)$ as defined before is the set of MSs that transmits at t by the scheduler. For $N_t(t)W$: total received power (in watts) at the BS, i.e, $N_t(t)W=I_t(t)W+N_0W$.

D: the delay budget of each packet buffered at an MS.

$T_k(t)$: the online measured average goodput in kbps for user k. $T_k(t)$ refers to bits from those packets successfully delivered within their delay budget over certain time period:

$$T_k(t+1) \equiv \left(1 - \frac{1}{t_l}\right)T_k(t) + \frac{1}{t_l}\min\{r_k(t), q_k(t)\}, \quad (1)$$

where $r_k(t)$ (in kbps) is the k's transmission rate as allowed by the scheduler at time t; $q_k(t)$ is the k's traffic backlogs (in kbits) that are within delay budget D by the end of t-th time slot.

$B_k(t)$: the mean radio (bandwidth) resources allocated to user k at time t, i.e., $$B_k(t+1) \equiv \left(1 - \frac{1}{t_l}\right)B_k(t) + \frac{1}{t_l}r_k(t). \quad (2)$$

Note that due to limited packet arrivals from real-time traffic, $B_k(t) \geq T_k(t)$, where "=" holds for heavily backlogged users only.

Given the above parameters, one can define the channel model for cellular uplink. The per-MS received SINR at the BS is as follows:

$$s_i(t) \equiv \frac{P_i(t)}{N_t(t)W - (1+f-\phi)G_{dv}G_a p_i(t)h_i(t)} \quad (3)$$

$$= \frac{p_i(t)h_i(t)}{N_0 W + (1+f)G_{dv}G_a \sum_{k \in I(t), k \neq i} p_k(t)h_k(t) + \phi G_{dv} G_a p_i(t) h_i(t)}.$$

Adopting Shannon capacity, one can write the instantaneous mutual information of user i as $r_i(t)=W \log_2(1+s_i(t))$. The RoT, i.e., the ratio between the total received power and thermal power as defined in Padovani's Reverse link performance paper, can be written as:

$$Z(t) \equiv \frac{I_t(t) + N_0}{N_0} \quad (4)$$

$$= 1 + (1+f)G_{dv}G_a \sum_{k \in I(t)} \frac{z_k(t)P_p}{N_0 W}.$$

Correspondingly, the total load of the system is:

$$L(t) \equiv 1 - \frac{1}{Z(t)} = \sum_{k \in I(t)} l_k(t), \quad (5)$$

where per-user load $l_k(t)$ is defined as:

$$l_k(t) \equiv \frac{(1+f)G_{dv}G_a P_k(t)}{N_t(t)W} \quad (6)$$

$$= \frac{(1+f)G_{dv}G_a s_k(t)}{1+(1+f-\phi)G_{dv}G_a s_k(t)}.$$

In other words, the per-user SINR can be represented by per-user load as follows:

$$s_i(t) = \frac{1}{G_{dv}G_a} \frac{l_i(t)}{(1+f)-(1+f-\phi)l_i(t)}. \quad (7)$$

Note that ROT $Z(t)$ is subjected to an upper bound $Z_{th}$ in practice, which is regarded as scheduling resource to be shared by MSs. The control variable is per-user TPR $z_k(t)=p_k(t)h_k(t)/P_p$, which ultimately corresponds to controlling the per-user transmission power $p_k(t)$ given current channel states $h_k$, $\forall k \in K$.

Delay-Aware Scheduling Framework

Regardless of uplink or downlink, real-time traffic have similar pattern and QoS expectations, both described in Sang et al.—*QoS-Aware Channel-Dependent Scheduling* . . . A key to RT scheduler design is to balance resource allocation or access control between "good-channel" and "time-critical" RT users. In other words, the scheduler has to trade off multiuser diversity gain for better delay performance.

Traditionally, bandwidth utility, see S. Shenker, "*Fundamental design issues for the future internet*", *IEEE J. Select*", *Areas Commun.*, 13(7):1176-1188, September 1995, for elastic best-effort traffic is used in formulating the scheduling of non-time-critical services, see Sang et al.—*Downlink scheduling* . . . . However, Sang et al.—*QoS-Aware Channel-Dependent Scheduling* . . . and Sang et al.—*Downlink scheduling* . . . , show that by designing per-user weight function carefully, such a formulation can derive similar approaches, 3gpp2-March 2004, for real-time services for the downlink. Therefore, the same strategy to formulate the uplink scheduling is adopted, with utility being a nondecreasing, strictly concave, and continuously differentiable function of the per-user bandwidth $B_i(t)$, rather than per-user throughput $T_i(t)$ to avoid the potential instability brought by the burstiness of traffic arrival. Hence, the scheduling problem at each time t can be formulated as follows:

$$\max_{\{p_i(t)\}} U(t), \quad (8)$$

$$\text{s.t.} : U(t) = \sum_{i=1}^{K} U_i(B_i(t)), \quad (9)$$

$$B_i(t) = \frac{1}{T}\sum_{\tau=1}^{T} r_i(t-\tau), \; \forall\, i \in K \quad (10)$$

$$r_i(t) = W\log_2(1 + s_i(t)), \; \forall\, i \in K \quad (11)$$

$$s_i(t) = \frac{p_i(t)h_i(t)}{N_0W + (1+f)G_{dv}G_a \sum_{k=1,k\neq i}^{K} p_k(t)h_k(t) + \phi G_{dv}G_a p_i(t)h_i(t)} \geq s_i^{min} 1_{(p_i(t)>0)}, \quad (12)$$

$$0 \leq p_i(t) \leq p_i^{max}, \; \forall\, i \in K \quad (13)$$

$$(1+f)G_{dv}G_a \sum_{i=1}^{K} p_i(t)h_i(t) \leq N_0W(Z_{th}-1) \quad (14)$$

where (10) is the formal definition of bandwidth $B_i(t)$ over the past T period, but in practice (2) is used to track more closely the dynamics in resource allocation; $s_i^{min}$ in (12) refers to the minimum received SINR required for the active (i.e., 0-1 indicator $1_{(p_i(t)>0)}=1$) users due to decoding constraints on packet error rate (PER); $p_i^{max}$ is the physical constraints of maximum transmit power (i.e., power headroom) for user i in watts. Eqn. (14) corresponds to the constraints on system RoT.

Following Sang et al.—Downlink scheduling . . . , adopt $$U_i(B_i(t)) = w_i(t)\frac{B_i(t)^{1-\alpha}}{1-\alpha}. \quad (15)$$

By taking a myopic, greedy approach as in Sang et al.—Downlink scheduling . . . , i.e., taking a slot-by-slot gradient ascend of the above objective function, and by converting per-user SINR $s_i(t)$ into per-user load $l_i(t)$, get an equivalent formulation as follows:

$$\max_{\{l_i(t)\}} \sum_{i=1}^{K} u_i(t), \quad (16)$$

$$\text{s.t.:} \; u_i(t) = \frac{w_i(t)}{B_i(t)^\alpha}W\log_2\left(1 + \frac{1}{G_{dv}G_a}\frac{l_i(t)}{(1+f)-(1+f-\phi)l_i(t)}\right), \quad (17)$$

$$\sum_{i=1}^{K} l_i(t) \equiv L(t) \leq 1 - \frac{1}{Z_{th}} \quad (18)$$

$$0 \leq l_i(t) \leq (1-L(t))(1+f)G_{dv}G_a\frac{p_i^{max}h_i(t)}{N_0W}, \; \forall\, i \in K \quad (19)$$

$$s_i(t) = \frac{1}{G_{dv}G_a}\frac{l_i(t)}{(1+f)-(1+f-\phi)l_i(t)} \geq s_i^{min} 1_{(l_i(t)>0)}, \; \forall\, i \in K. \quad (20)$$

Note the myopic greedy approach assumes that the system is a causal system. In other words, in the above formulation, $B_i(t)$, $l_i(t)$, and only one-step of future channel state $h_i(t)$ are known at the beginning of each (t-th) time slot before the scheduling decision making.

To find a feasible set of $\{l_i(t)\}$, conduct the following transformation: Because $$l_i(t) \leq L(t) \leq 1 - \frac{1}{Z_{th}}, \; \forall\, i$$

and considering (18), can tighten the constraint of (19) by requiring:

$$(1-L(t))(1+f)G_{dv}G_a\frac{p_i^{max}h_i(t)}{N_0W} \leq L(t) \leq 1 - \frac{1}{Z_{th}}, \; \forall\, i.$$

In other words, the maximum allowable transmission power $p_i^{max}$ for each user i is tightened as $\bar{p}_i^{max}$ so that:

$$p_i(t) \leq \bar{p}_i^{max} \equiv \min\left\{p_i^{max}, \frac{\frac{L(t)}{1-L(t)}N_0W}{(1+f)G_{dv}G_a h_i(t)}\right\}, \; \forall\, i. \quad (21)$$

In other words, (18), (20) and (19) are equivalent to the following new constraints for feasible set of $\{l_i^*(t), \forall i\}$:

$$\frac{(1+f)G_{dv}G_a s_i^{min}}{1+(1+f-\phi)G_{dv}G_a s_i^{min}}1_{(l_i(t)>0)} \leq l_i(t) \leq \quad (22)$$

$$\min\left\{L(t), (1-L(t))(1+f)G_{dv}G_a \frac{p_i^{max}h_i(t)}{N_0W}\right\},$$

$$0 \leq \sum_{i=1}^{K} l_i(t) \equiv L \leq 1 - \frac{1}{Z_{th}}, \; \forall\, i. \quad (23)$$

Now let us see some special cases.

Suppose $\alpha=0$ in (17), $s_i^{min}=0(\forall i)$. Then our formulation would be very similar to the formulation in Kumaran et al. (see (10) and (11) therein), with $\alpha_i$ therein corresponds to $l_i(t)$ here, and with $1/Z_{th}=0$ therein. Furthermore, when $(1+f-\phi)G_{dv}G_a \geq 0.5$, as normally it is in practice, $u_i(t)$ is a convex function of $l_i(t)$. Thus the above optimization, i.e., (16) and its constraints, is a combinational optimization in which a convex function is to be maximized with linear constraints. The optimal solution would be to find an optimal $L^*(t)\in[0,1-1/Z_{th}]$, such that the optimal set of $\{l_i^*(t)\}$ is vertices of the polygon that corresponds to the aforementioned constraint (22).

Following Kumaran et al. and L. and Oh et al., e.g., Theorem 1 in Kumaran et al., this optimal solution implies that some users would transmit at full power, i.e., $p_i^*(t)=\bar{p}_i^{max}$ while others in the complementary set remain silent, i.e., $p_i^*(t)=0$. Therefore, it is a TDMA/CDMA scheduling process, named as TDMA/CDMA weighted Max-C/I (T/C-wMaxC/I). Note that this process with its optimal solution is named as OPT in Kumaran et al. Refer to Kumaran et al., the optimal solution set or OPT requires an iterative searching of complexity $O(K^3 \log K)$. Later. It is seen that an approximate solution of T/C-wMaxC/I delivers low goodput for real-time services. Now shown here, it delivers high throughput for best-effort services of infinite traffic backlog, but suffers from the location-based service unfairness as Max-C/I in the downlink scenario.

Suppose $\alpha>0$ in (17), $s_i^{min}=0(\forall i)$. The solution to our formulation is the same as to the case of $\alpha=0$. Again, we will have a TDMA/CDMA hybrid scheduler which we name as TDMA/CDMA weighted Alpha-Rule (T/C-wAlphaRule) scheduler. A special case of T/C-wAlphaRule is when $\alpha=1$, which we name as TDMA/CDMA weighted PF (T/C-wPF). Note that our T/C-wPF algorithm, as a weighted version of UPF in Kumaran et al., is obtained from the above formulation, while UPF in Kumaran et al. is a purely heuristic approach. Later, it will be seen that T/C-wPF has the best real-time performance in terms of goodput and power efficiency.

Given $\alpha \geq 0$, and suppose $p_i^{max}=\infty$, i.e., all MSs have unconstrained transmission power, then the optimal scheduler is a TDMA scheduler that picks a single backlogged user with maximum $u_i(t)$ at time t. We name this scheme as TDMA weighted Alpha-Rule (T-wAlphaRule) scheduler. When $\alpha=1$, T-wAlphaRule degenerates into weighted PF scheduling as adopted in the downlink scenario. When $\alpha=0$, T-wAlphaRule degenerates into weighted Max-C/I scheduling for the downlink. Note that in practice, the constraint of $p_i^{max}$ could be very tight, especially for the poor-channel users at cell boundary. In this scenario, it will be seen later that the purely TDMA scheduler (T-wAlphaRule) delivers low goodput.

Below is shown the conversion from optimization (8) to optimization (16). First, by taking derivative of $U(B_i(t))$ as a function of $r_i(t)$, as in Sang et al.—Downlink scheduling . . . , it can easily be seen that the causal maximization of target (8) is equivalent to the myopic (slot-by-slot) optimization of target (16). Next it can be seen that the constraints in the second optimization are equivalent to the constraints in the first. First, by (6) and $P_i(t)=p_i(t)h_i(t)\geq 0$, we have:

$$p_i(t)h_i(t) = \frac{l_i(t)}{(1+f)G_{dv}G_a}N_t(t)W$$

$$= \frac{l_i(t)}{(1+f)G_{dv}G_a}\frac{N_0 W}{1-\sum_{k\in I(t)}l_k(t)}$$

$$\leq p_i^{max}h_i(t), \forall i.$$

Hence, (13) is equivalent to $$0 \leq l_i(t) \leq \left(1-\sum_{k\in I(t)}l_k(t)\right)(1+f)G_{dv}G_a\frac{p_i^{max}h_i(t)}{N_0 W}, \forall i.$$

which corresponds to (19). On the other hand, from (4) and (4), it is straightforward that the constraint of (14) or $Z(t) \leq Z_{th}$ is equivalent to L(t)

$$L(t) = \sum_{k\in I(t)}l_k(t) \leq 1 - \frac{1}{Z_{th}},$$

i.e., the constraint of (18) in the second formulation.

Hybrid TDMA/CDMA Scheduler

An iterative approach to solve the optimization problem in (16) is adopted. Our goal is to greedily fill the system resource, i.e., RoT budget L(t), as much as possible by activating the largest-utility users selected from a sorted list. By the above discussion, the optimal solution of $\{l_i(t)\}$ is actually optimal assignment of power allocation for all MSs: for MSs in the active set, $p_i^*(t)=\bar{p}_i^{max}$, while others in the complementary set remain silent, i.e., $p_i^*(t)=0$.

Consequently, we have an NP-hard Knapsack problem with maximum capacity $$L^*(t) \leq 1 - \frac{1}{Z_{th}}$$

to be shared by MSs with per-user resource consumption of $$l_i^*(t) \leq \min\left\{L^*(t), (1-L^*(t))(1+f)G_{dv}G_a\frac{p_i^{max}h_i(t)}{N_0 W}\right\}$$

or 0, which corresponds to $p_i^*(t)=\bar{p}_i^{max}(t)$ or 0. However, our greedy filling of $L^*(t)$ is also subject to increasing target expectation of (16), as well as an SINR constraint (20) or the left-hand side of (22). In other words, the ultimate total resource consumption $L^*(t)$ may effectively be much less than $1-1/Z_{th}$.

In light of the above, at the beginning of each time slot t, our scheduler has the following solution steps to the Knapsack problem:

Initialization:

$$\text{set } L^*(t) = 1 - \frac{1}{Z_{th}}; I(t) = NULL;$$

NULL; and:

$$p_i^{max} = \bar{p}_i^{max} \equiv \min\left\{p_i^{max}, \frac{\frac{L^*(t)}{1-L^*(t)}N_0 W}{(1+f)G_{dv}G_a h_i(t)}\right\}.$$

TDMA/CDMA Weighted Alpha-Rule—Solution Steps:

1. $\forall i$ (backlogged users), let $$l_i(t) = l_i^{RoT}(t) \equiv (1-L^*(t))(1+f)G_{dv}G_a\frac{\bar{p}_i^{max}h_i(t)}{N_0 W}.$$

2. Sort i's into a list U with decreasing $$u_i^{RoT}(t) = \frac{w_i(t)}{B_i(t)^\alpha}W\log_2\left(1+\frac{1}{G_{dv}G_a}\frac{l_i^{RoT}(t)}{(1+f)-(1+f-\phi)l_i^{RoT}(t)}\right).$$

3. Move the first user i from U into I(t), calculate i's (interference-free) SINR $s_i(t,I)$ (see below for the equation) and utility increment $u_i(t,I)$ (see below).

4. Remove the next user k from U. Let $I'(t)=I(t)+\{k\}$. Proceed to check whether $I'(t)$ offers better utility than $I(t)$ below under RoT and $s_i^{min}(\forall i \in I'(t))$ constraints.

5. Calculate I'(t)-defined SINR:

$$s_i(t, I') = \frac{\overline{p}_i^{max} h_i(t)}{N_0 W + (1+f) G_{dv} G_a \sum_{k \in I'(t), k \neq i} \overline{p}_k^{max} h_k(t) + \phi G_{dv} G_a \overline{p}_i^{max} h_i(t)}, \forall i \in I'(t),$$

Is $\exists i \in I'(t)$, $s_i(t,I') < s_i^{min}$? If yes, go back to previous step. Otherwise proceed to the next step.

6. $\forall i \in I'(t)$, calculate I'(t)-defined per-user load and utility increment:

$$l_i(t, I') = \frac{(1+f) G_{dv} G_a s_i(t, I')}{1 + (1+f-\phi) G_{dv} G_a s_i(t, I')},$$

$$u_i(t, I') = \frac{w_i(t)}{B_i(t)^\alpha} W \log_2(1 + s_i(t, I)).$$

7. Calculate $$L(t) = 1 - \frac{1}{(1+\delta) Z_{th}} - \sum_{\forall i \in I'(t)} l_i(t, I').$$

If L(t)<0 or $$\sum_{\forall i \in I'(t)} u_i(t, I') < \sum_{\forall i \in I(t)} u_i(t, I),$$

and if U≠NULL, go back to Step 4.

8. Add k to I(t): I(t)=I'(t), L*(t)=L(t). If U=NULL, stop with scheduling decision as $$\{p_i(t) = \overline{p}_i^{max} 1_{(i \in I(t))}, \forall i \in K\}.$$

Otherwise, go back to Step 4.

Note that in the above, differential power between 0 and $\overline{p}_i^{max}$ is not allowed. In Step 7, δ is the RoT overshooting probability. It is usually set as 1% in practice. The weight function $w_i(t)$ of each user can be set as HOL delay of the first real-time packet, following M-LWDF algorithm, see 3gpp2-March 2004, for downlink scheduling.

With slight change, one can adapt the above algorithm, for example, to make it T/C-wPF when α=1, or T/C-wMaxC/I when α=0, or T/C-wAlphaRule for any other α in $u_i(t)$. A purely TDMA algorithm, e.g, T-wAlphaRule, would schedule the first user only from the list U with decreasing $u_i(t)$, where $u_i(t)$ is calculated as in an interference-free or single-user access system.

Note that Step 1 effectively initiates $l_i(t)$ as min $$\left\{ L^*(t), \frac{\frac{L^*(t)}{1 - L^*(t)} N_0 W}{(1+f) G_{dv} G_a h_i(t)} \right\},$$

where $$L^*(t) = 1 - \frac{1}{Z_{th}}.$$

This actually estimates the per-user load $l_i(t)$ as the ratio of maximum received power from user i, i.e., $(1+f) G_{dv} G_a \overline{p}_i^{max} h_i(t)$ if suppose i is transmitting at its full power, to the maximum allowed total interference, i.e., $N_t(t) W = N_0 W Z_{th}$. Similarly, Step 2 estimates per-user utility increment $u_i^{RoT}(T)$ with $N_t(t) W = N_0 W Z_{th}$, i.e., assuming each user is facing the maximum allowable interference. In contrast, all the other steps estimate variables, such as $l_i(t)$, $l_i(t)$, and $l_i(t)$, based on "existing" interference with only active users in I(t). In addition, the first load check in Step 7 is actually equivalent to checking whether $$1 + (1+f) G_{dv} G_a \sum_{k \in I'(t)} \frac{\overline{p}_k^{max} h_k(t)}{N_0 W} > (1+\delta) Z_{th}.$$

Related Work in Uplink Packet Scheduling

Next a comparison of the inventive solution with prior art is made. Note that our final optimization derives a Knapsack optimization problem, which lends us a stronger ground in developing the heuristic algorithms that could outperform the prior art.

First is the ER-CDMA scheduling algorithm, as used in a distributed version in 1xEV-DO.A, which imposes that all backlogged users have the same received power or SINR. In other words, ER-CDMA assumes that α=0, $w_i(t) = w_j(t) (\forall i,j)$, and $u_i(t)$ is a concave function of $l_i(t)$ in (16) and the constraints. It is easy to see that ER-CDMA based on such assumptions delivers competitive goodput performance, but its power efficiency is much lower than TDMA/CDMA hybrid approaches.

Secondly, we compare our algorithms with those in Kumaran et al., because our reformatted optimization framework (16) can be considered as an extension to the optimization target (1) in Kumaran et al., and our approximate solutions also follow a similar greedy approach as the QRP approximation in Kumaran et al. The key differences are our adoption of utility function $U_i(t)$ and myopic derivative $u_i(t)$ in our optimization framework, as well as the RoT constraint L(t) which transforms the optimization into a Knapsack problem. As discussed before, our framework derives some special cases, e.g., T/C-wAlphaRule, which degenerates into T/C-wMaxC/I when α=0 and T/C-wPF when α=1.

On the other hand, the TDMA/CDMA hybrid approach QRP in Kumaran et al., a greedy approximation to the optimal process OPT by sorting MSs in $$\frac{w_i(t) r_i(t)}{\overline{p}_i}$$

[Kumaran et al.], seems similar to our T/C-wPF, but the maximum received power $\overline{p}_i$ in QRP is $p_i^{max} h_i(t)$ in our notations, i e, the instantaneous maximum received power. It certainly differs from the scheduler-allocated mean bandwidth $B_i(t)$, which is used as the denominator in our T/C-wAlphaRule and T/C-wPF. Such a slight difference could result in vastly difference performance! In addition, $r_i(t)$ in QRP is initialized as interference-free, while in our schemes it is calculated by assuming a maximum interference (i.e., $N_t(t)=Z_{th}N_0$ or $$L = 1 - \frac{1}{z_{th}}).$$

Consequently, our T/C-wPF performs very differently from QRP. On the one hand, the MaxQR in Kumaran et al. in our notation is $i^*(t)=\mathrm{argmax}_i\, w_i(t)r_i(t)$, which seems similar to our T/C-wMaxC/I but is actually purely TDMA. Later we will see that TDMA-based approaches obviously has lower performance than TDMA/CDMA hybrid (e.g., T/C-wMaxC/I).

Performance Evaluations

A single-cell HSUPA system is modeled, where inter-cell interference is considered by the other-cell-to-same-cell interference factor f, the slot size is 2 ms, and the channel bandwidth of 5 MHz. Without loss of generality and for simplicity, H.263 RT video streaming users are considered. Each user has only one flow. Similar to Shakkottai et al., each RT flow as a Bernoulli process with profile rate of $m_k=64$ kbps is modeled. Given an exponential packet size with mean equal to 80 bytes, the packet inter-arrival time is around 10 ms. Only shown are the results with packet delay budget of D=100 ms. Also tested was the other profile rate, e.g., $m_k=128$ or 256 Kbps, with D=100 ms or 2.5 sec, respectively.

A micro-cell is simulated, where inter-BS distance is set as 1.04 Km. User's channel is modeled by path-loss, fast Rayleigh fading, Log-normal Shadow fading with a standard deviation of 4 dB. In other words:

$$h_i(t) = (ad^{-\beta}) \cdot 10^{\frac{u}{10}} \cdot |N_c(0, 1)|, \forall\, i,$$

where $$d \in \left[0, \frac{1.04}{\sqrt{3}}\right]$$

Km is the random distance from the MS to the BS, and is generated by $$d = \frac{1.04}{\sqrt{3}} \sqrt{N(0, 1)}$$

for uniformly distributed MSs in a cell of radius $$\frac{1.04}{\sqrt{3}} Km;$$

$(\alpha,\beta)=(1.6982\times10^{-15}, 4.0)$ as the path-loss factors, corresponding to a path loss of $-147.7-40\log_{10}^d$ in dB for a WCDMA micro-cell; $u\square\sigma\cdot N(0,1)$ with standard normal deviation. In all simulations, an $s_i^{min}=0$, $\forall i$ is assumed. For other parameters, please refer to Table 1 below.

TABLE 1

Simulation parameters for the HSUPA micro-cell.

| | |
|---|---|
| $P_i^{max}$ | 0.0794(watts) or 19 dBm |
| $N_o W$ | $6.0256 \times 10^{-14}$(watts) or $-102.2$ dBm |
| $Z_{th}$ | 5.0119 or 7 dB |
| f | 0.55 |
| $G_{dv}$ | 0.948 |
| $G_\alpha$ | 1 |
| $\phi$ | 0.01 |

Table 1. Simulation parameters for the HSUPA micro-cell.

A test per-user and aggregate performance was done through two setups. (A): In the first setup, there was created a cell of a fixed number (K) of static users, with their locations uniformly distributed in cell's boundary. For each given K, there were collected the aggregated QoS (e.g., delay, loss, goodput, power consumption) in the system by averaging results from 50 independent runs. Each run lasts 36000 time slots, so is the user's lifetime. Given different K's the system will be under different loads. Thus, one could evaluate the scheduling processes under different loading scenarios. (B): In the second setup, K was fixed at a typical value (16), and analyzed per-user performance including access fairness and per-user goodput, etc., over a period of 180000 slots. For all simulations, the mean bandwidth allocation $B_i(t)$ was measured with $t_f=1000$ slots.

In the simulation, there were evaluated four schemes introduced before, T/C-wPF, T/C-wMaxC/T, ER-CDMA, and T-wAlphaRule (with $\alpha=0.5$). The first two schemes were special cases of TDMA/CDMA hybrid T/C-wAlphaRule, the third one was a centralized version of the CDMA scheduler used in 1xEV-DO.A, and the last scheme was purely TDMA. For simplicity, there was a skipping of purely TDMA-based T-wPF and T-wMaxC/I, whose performances closely encapsulate that of T-wAlphaRule (with $\alpha=0.5$), as shown in Sang et al.—Downlink Scheduling . . . for the downlink, and are generally worse than their TDMA/CDMA hybrid counterparts, respectively.

Figure 2:
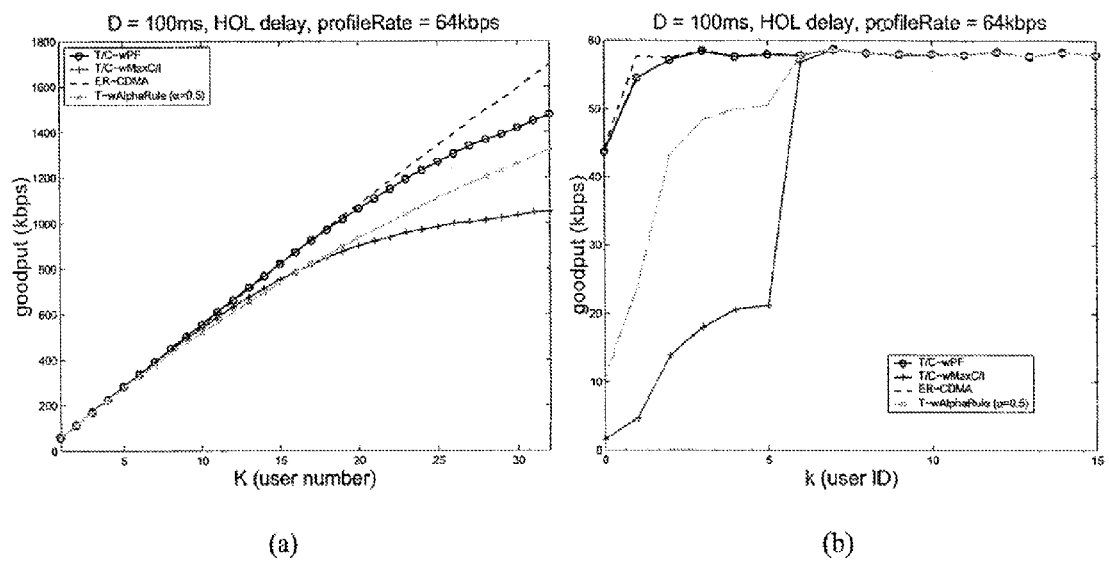
FIG. 2 shows plots of Goodput performance for profile rate of 64 Kbps and D=100 ms (default): (a) aggregate goodput, (b) per-user goodput.

1. Goodput Performance: Given the above setups, first evaluated was the aggregate and per-user mean goodput performance, as shown in FIG. 2(a) and (b), respectively. In FIG. 2(b), as in all the similar plots thereafter, the 16 users are sorted in increasing order of channel gain, so that MSs of larger IDs can be considered closer to the BSs. Clearly, ER-CDMA and T/C-wPF achieve the highest goodput under both scenarios among all the schedulers. Note that for K larger than 20 or 25 in FIG. 2(a), the cell is excessively loaded, which should be an anomaly in a well-controlled cell. In FIG. 2(b), the low-ID users usually see large interference at the BS due to the upper-bounded transmission power and low channel gain, hence their inferior goodput performance.

Note that T-wAlphaRule's poor performance is due to the TDMA access, which allows only one user to access when multiple access of "weak" channel users may bring larger goodput. On the other hand, T/C-MaxC/I's poor performance is due to its inherent biases towards good-channel users, which may starve poor-channel users and hence cause unnecessary delay-violation or packet losses.

Figure 3:
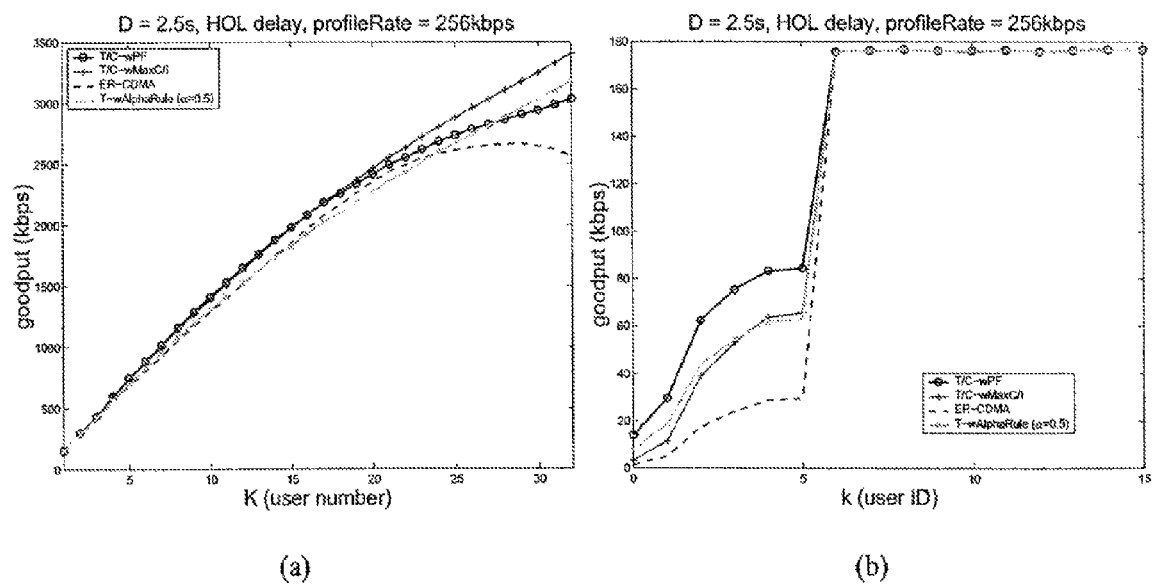
FIG. 3 shows plots of Goodput performance for profile rate of 256 kbps, D=2.5 sec: (a) aggregate goodput, (b) per-user goodput.

There was also observed similar goodput performance with profile rate of 128 Kbps and the same D=100 ms, but it becomes more obvious that T/C-wPF performs better than ER-CDMA in both aggregate (with K≦17) and per-user goodput. When users' profile rate and delay tolerance are much higher (256 Kbps and 2.5 sec), as in FIG. 3(a) and (b), our scheme T/C-wPF performs better than ER-CDMA across the whole region of K (see (a)) and k (see (b)), because ER-CDMA equally share the RoT resources among all users, regardless of per-user's instantaneous channel states, i.e., without the multiuser diversity gain.

Figure 4:
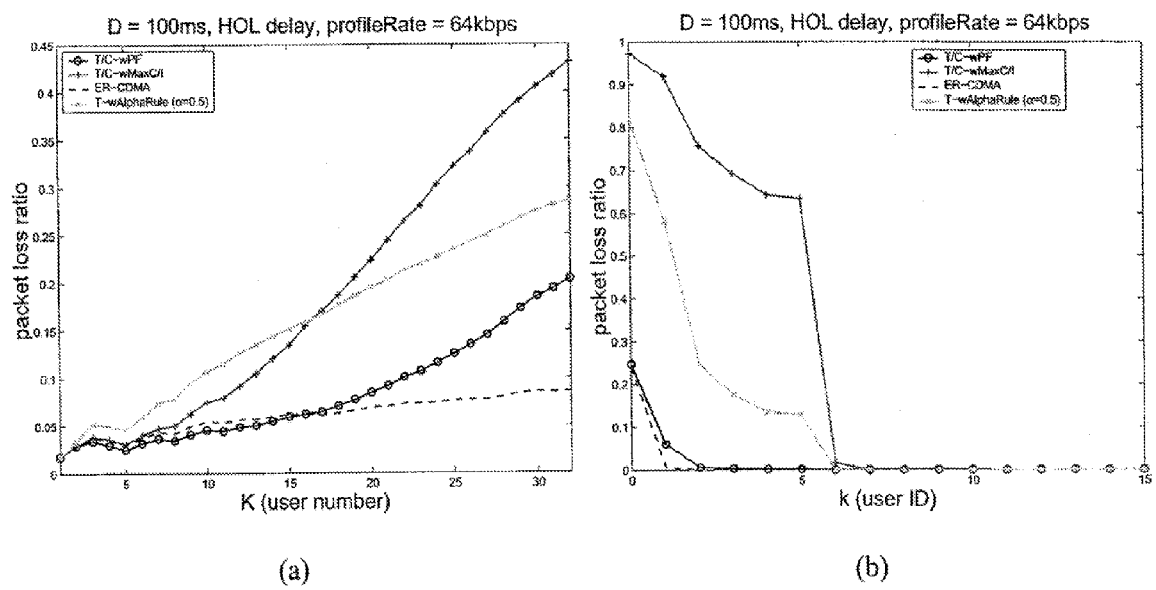
FIG. 4 shows plots of Packet loss ratio: (a) aggregate loss, (b) per-user loss.

2. Packet Loss and Delay: FIG. 4(a) and (b) show the aggregate and per-user packet losses under different scheduling schemes. Again ER-CDMA and T/C-wPF are the best, consist with their goodput performance. It is more clear from FIG. 4(a) that the loss ratio would be well above normal range of tolerance for video transmission (5%) when K is larger than about 17.

Figure 5:
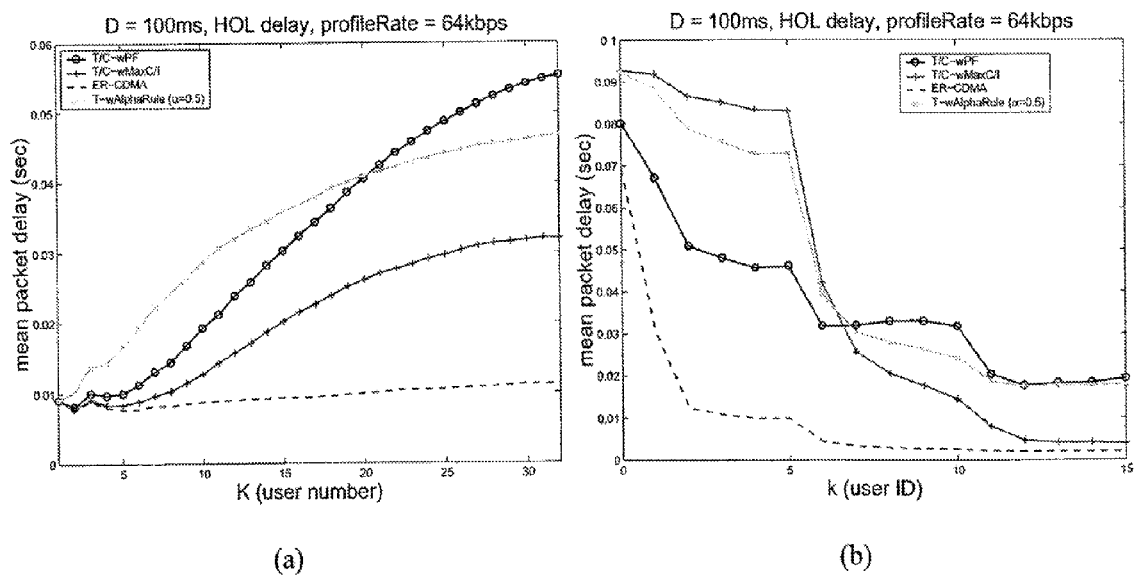
FIG. 5 shows plots of Packet delay performance: (a) aggregate mean packet delay, (b) per-user mean packet.

FIG. 5(a) and (b) show the delay performance, i.e., the mean delay of successfully delivered packets within the delay threshold D=100 ms. ER-CDMA has a much better delay than any other schemes, because it supports continuous transmission of all users. By FIG. 5(a), T/C-wPF has seemingly larger delay than T/C-wMaxC/I, but it does not reflect the fact that the former transmits more packets than the latter. As far as the packets are delivered within the delay budget, more or less delay does not really impact the user-perceived video performance.

Figure 6:
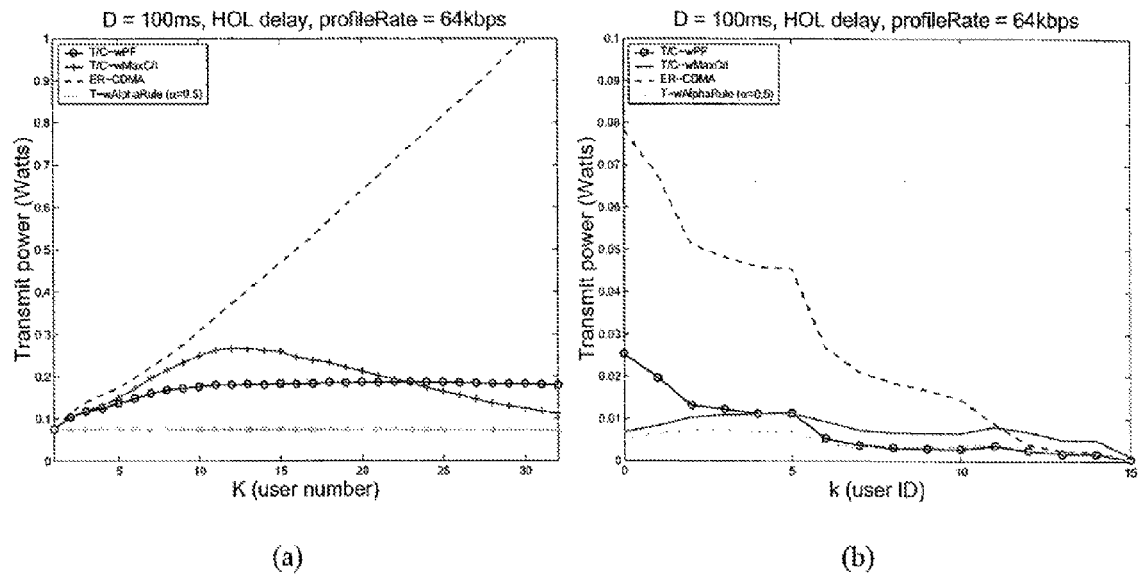
FIG. 6 shows plots of mean power consumption: (a) aggregate power usage, (b) per-user power usage.

3. Power Consumption and Goodput/Power Efficiency. Up to now, it seemed that the purely CDMA-based approach (ER-CDMA) could deliver comparable good performance in terms of goodput, delay, and losses as T/C-wPF does, when the request profile rate was low. However, without multiuser diversity gain, ER-CDMA achieves such good performances at a high cost of power efficiency. FIG. 6(a) and (b) show the mean power consumption for all and individual users under different scheduling schemes, while FIG. 7(a) and (b) show the system's goodput-to-power ratio, in other words the power efficiency.

Figure 7:
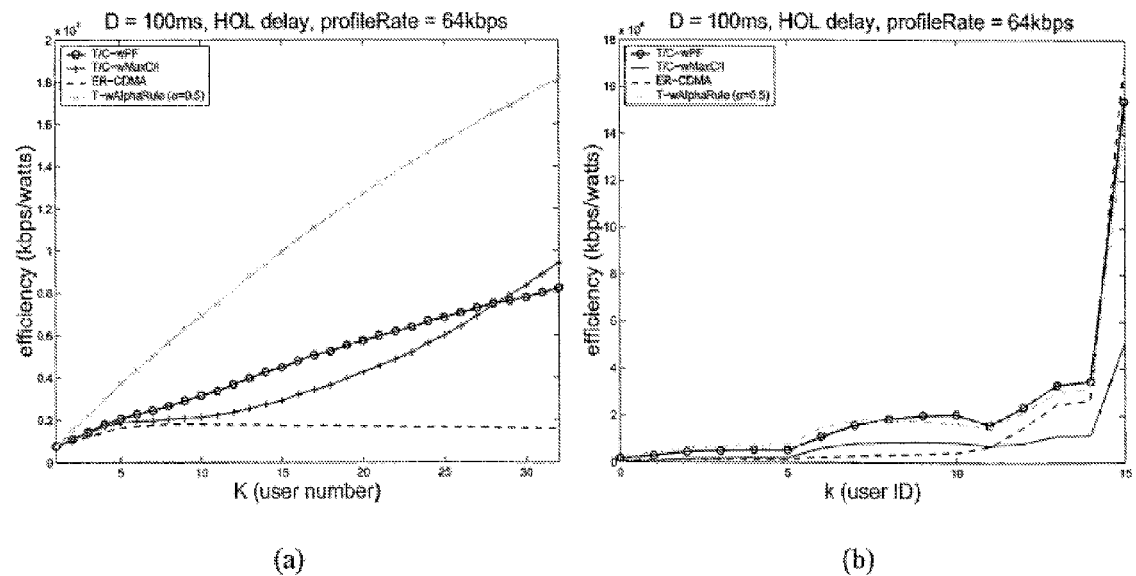
FIG. 7 shows plots of Goodput/power efficiency: (a) system efficiency, (b) per-user efficiency.

Both FIG. 6(a) and FIG. 7(a) show that ER-CDMA uses excessively more power than the other schemes, therefore putting a strain on the limited power resource of user equipment (say, a cell phone). FIG. 6(b) shows that users across the cell domain, especially the boundary users (e.g., k=0□5), if under ER-CDMA would use too much power. Actually the k=0 user would have to use its full power (0.0794 watts) to transmit. Other schemes, by taking advantage of instantaneous channel states and turn off those users whose channels are becoming bad, can effectively reduce the interference and thus power consumption for all users.

FIG. 6(b) shows that under the purely TDMA scheme (T-wAlphaRule), the total transmit power is constantly one-user's maximum allowed power (0.0794 watts), because at any moment only one user is transmitting without interference. Its efficiency as shown in FIG. 7(b) is undoubtedly the highest, though its goodput is also lower. Comparatively our TDMA/CDMA scheme (T/C-wPF) delivers high goodput as its total power consumption remains flat and its efficiency increases across the whole region of K. Obviously it represents the best scheme with both high goodput and low power consumption.

Figure 8:
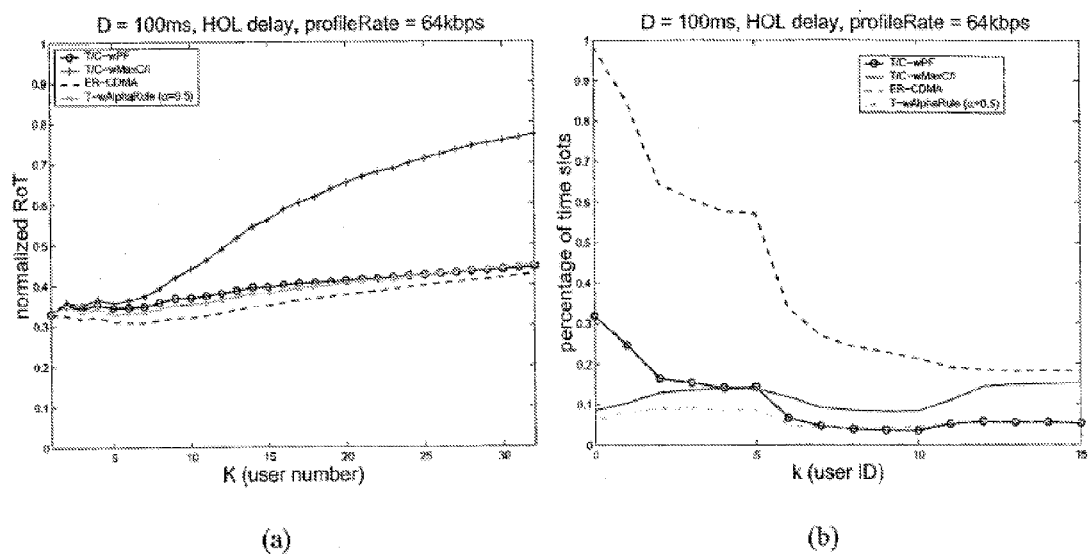
FIG. 8 shows plots of RoT resource consumption and access fairness: (a) aggregate RoT (normalized by $Z_{th}$), (b) per-user access by percentage of time slots.

4. RoT Resource Consumption and Access Fairness. FIG. 8(a) show measured RoT in the system, which has been normalized by the RoT limit $Z_{th}$, under different scheduling schemes. Interestingly, none of the schemes are close to the RoT limit even under heavy loads (i.e., with a big K). Taking ER-CDMA for example. It allocates the total RoT resources $Z_{th}$ equally among MSs. However, poor-channel users can't use up the allocated resources (due to path-loss and tx power limit) while good-ch users are constrained by the traffic availability and/or limited allocation; On the other hand, both TDMA/CDMA processes, T/C-wPF and T/C-wMaxC/I, see the constraint of an increasing utility $$\left( \sum_{\forall i \in I'(t)} u_i(t, I') < \sum_{\forall i \in I(t)} u_i(t, I) \right)$$

in the Step 7 of the TDMA/CDMA processes before the L reaches 0 (i.e., RoT budget depletes). Finally, it is obvious that the purely TDMA approach (T-wAlphaRule) can't fill up RoT budget due to limited transmission power per user.

FIG. 8(b) shows the percentage of time slots when individual users are allowed to access the BS. In other words, it shows the "fairness" of air-time used by users. It is very intuitive that this metric shows similar results as the metric of per-user transmission power in FIG. 6(b): ER-CDMA keeps poor-channel users alive for most of the time in order for them to reach the profile rate under heavy interference from simultaneously transmitting competitors. Thus those users under ER-CDMA will have a short battery life.

In contrast, both TDMA/CDMA schemes and the purely TDMA approach (T-wAlphaRule) have better "fairness"—they turn on users equally likely at their channels' peak time. By doing so, they save energy and reduce the interference. In summary, the Table in FIG. 9 presents the qualitative comparisons of all the scheduling schemes. T/C-wPF for its excellent performance by all metrics is the best choice.

To summarize, the centralized real-time scheduling schemes and the TDMA/CDMA weighted Alpha-Rule for enhanced 3G cellular uplink systems such as WCDMA HSUPA have been examined. In light of a proposed utility-based scheduling framework the inventive heuristic TDMA/CDMA solution procedure has been developed, an extension to Applicants' previous work for downlink scheduling, see Sang et al.—Downlink scheduling . . . and an important literature Kumaran et al. The invention's differences with the prior art noted, and compared the specific processes of the invention, T/C-wPF and T/C-wMaxC/I, with legacy schemes, such as purely the CDMA-based scheme (ER-CDMA) and the purely TDMA-based (T-wAlphaRule) scheme. Note that ER-CDMA as a centralized version of the process that 1xEV-DO.A system adopted represents performance bound for such a system. The comparison results show that inventive T/C-wPF may be the best choice to handle bursty or real-time packet data services: It exploits multiuser diversity gain by activating users with favorable instantaneous channel states, and fully utilizes uplink radio resources by allowing multiple access. Consequently, it delivers higher goodput than (T-wAlphaRule), and reduces power consumption significantly if compared with the ER-CDMA approach. Intuitively, in a multicell environment, the TDMA/CDMA hybrid approach reduces the serious inter-cell interference as commonly caused/seen by boundary users under the purely CDMA schemes.

The present invention has been shown and described in what are considered to be the most practical and preferred embodiment. It is anticipated, however, that departures may be made there from and that obvious modifications will be implemented by those skilled in the art. It will be appreciated that those skilled in the art will be able to devise numerous arrangements and variations which, although not explicitly shown or described herein, embody the principles of the invention and are within their spirit and scope.

What is claimed is:

1. A method comprising the steps of:

constraining total power received from cellular users accessing a base station through any one of a TDMA access, CDMA access, and a derivation of a TDMA/CDMA access, and scheduling users for access to the base station within the constrained total power in response to an optimization that for each time slot determines a group of time critical cellular users and their transmission power factoring in instantaneous location-dependent channel states and long term quality of service performance, wherein the optimization includes the following steps:

i) $\forall i$ (backlogged users), letting $$l_i(t) = l_i^{RoT}(t) \equiv (1 - L^*(t))(1 + f)G_{dv}G_a \frac{\overline{p}_i^{max} h_i(t)}{N_0 W};$$

ii) sorting i's into a list U with decreasing $$u_i^{RoT}(t) = \frac{w_i(t)}{B_i(t)^a} W \log_2\left(1 + \frac{1}{G_{dv}G_a} \frac{l_i^{RoT}(t)}{(1+f) - (1+f-\phi)l_i^{RoT}(t)}\right);$$

iii) moving the first user i from U into I(t), calculating i's (interference-free) SINR $s_i(t,I)$ (see below for the equation) and utility increment $u_i(t,I)$ (see below);

iv) removing the next user k from U and letting $I'(t) = I(t) + \{k\}$, then proceeding to check whether $I'(t)$ offers better utility than $I(t)$ below under RoT and $s_i^{min}(\forall i \in I'(t))$ constraints;

v) calculating $I'(t)$-defined SINR as follows:

$$s_i(t, I') = \frac{\overline{p}_i^{max} h_i(t)}{N_0 W + (1+f)G_{dv}G_a \sum_{k \in I'(t), k \neq i} \overline{p}_k^{max} h_k(t) + \phi G_{dv} G_a \overline{p}_i^{max} h_i(t)}, \forall i \in I'(t);$$

vi) checking if $\exists i \in I'(t), s_i(t, I') < s_i^{min}$, and if yes, going back to the previous step, otherwise proceeding to the next step;

vii) $\forall i \in I'(t)$, calculating $I'(t)$-defined per-user load and utility increment as follows $$l_i(t, I') = \frac{(1+f)G_{dv}G_a s_i(t, I')}{1 + (1+f-\phi)G_{dv}G_a s_i(t, I')},$$

$$u_i(t, I') = \frac{w_i(t)}{B_i(t)^a} W \log_2(1 + s_i(t, I));$$

viii) calculating $$L(t) = 1 - \frac{1}{(1+\delta)Z_{th}} - \sum_{\forall i \in I'(t)} l_i(t, I');$$

If $L(t) < 0$ or $$\sum_{\forall i \in I'(t)} u_i(t, I') < \sum_{\forall i \in I(t)} u_i(t, I),$$

and if U≠NULL, then going back to step iv);

ix) adding k to I(t): $I(t) = I'(t)$, $L^*(t) = L(t)$; If U=NULL, stop with scheduling decision as $\{p_i(t) = \overline{p}_i^{max} 1_{(i \in I(t))}, \forall i \in K\}$; otherwise, going back to Step iv).

2. An apparatus comprising:

a total power limit for receiving transmissions from cellular users through any one of a TDMA access, CDMA access, and a derivation of a TDMA/CDMA access, and a scheduler for selecting access by the cellular users to a base station within the total power in response to an optimization that for each time slot determines a group of time critical cellular users and their transmission power factoring in instantaneous location-dependent channel states and long quality of service performance wherein the optimization includes at least one of:

an iterative solution of an NP-hard Knapsak problem with initialization of maximum transmit power per cellular user inversely proportional to at least one of an activity factor of a cellular user's channel ($G_{dv}$), the cellular user's antenna gain ($G_a$), the instantaneous channel gain of a dedicated uplink channel for the cellular user ($h_i(t)$), and other-cellular user to same-cellular user interference ratio (f), and directly proportional to total resource power consumption ($L^*(t)$); and for backlogged cellular users, a load defined per cellular user to be directly proportional to an activity factor of a cellular user's channel ($G_{dv}$), a cellular user's antenna gain ($G_a$), an instantaneous channel gain of a dedicated uplink channel for the cellular user ($h_i(t)$), optimal assignment of power allocation or all cellular users ($p_i^{-max}$), other-cellular user to same-cellular user interference ratio (f), and inversely proportional to total received power by the base station ($N_o W$).

3. An apparatus comprising:

a total power limit for receiving transmissions from cellular users through any one of a TDMA access, CDMA access, and a derivation of a TDMA/CDMA access, and a scheduler for selecting access by the cellular users to a base station within the total power in response to an optimization that for each time slot determines a group of time critical cellular users and their transmission power factoring in instantaneous location-dependent channel states and long term quality of service performance wherein the optimization includes:

i) $\forall i$ (backlogged users), letting $$l_i(t) = l_i^{RoT}(t) \equiv (1 - L^*(t))(1 + f)G_{dv}G_a \frac{\overline{p}_i^{max} h_i(t)}{N_0 W};$$

ii) sorting i's into a list U with decreasing $$u_i^{RoT}(t) = \frac{w_i(t)}{B_i(t)^a} W \log_2\left(1 + \frac{1}{G_{dv}G_a} \frac{l_i^{RoT}(t)}{(1+f) - (1+f-\phi)l_i^{RoT}(t)}\right);$$

iii) moving the first user i from U into I(t), calculating i's (interference-free) SINR $s_i(t,I)$ (see below for the equation) and utility increment $u_i(t,I)$ (see below);
iv) removing the next user k from U and letting $I'(t)=I(t)+\{k\}$, then proceeding to check whether $I'(t)$ offers better utility than $I(t)$ below under RoT and $s_i^{min}(\forall i \in I'(t))$ constraints;
v) calculating $I'(t)$-defined SINR as follows:

$$s_i(t, I') = \frac{\overline{p}_i^{max} h_i(t)}{N_0 W + (1+f) G_{dv} G_a \sum_{k \in I'(t), k \neq i} \overline{p}_k^{max} h_k(t) + \phi G_{dv} G_a \overline{p}_i^{max} h_i(t)}, \forall i \in I'(t);$$

vi) checking if $\exists i \in I'(t)$, $s_i(t,I') < s_i^{min}$, and if yes, going back to the previous step, otherwise proceeding to the next step;
vii) $\forall i \in I'(t)$, calculating $I'(t)$-defined per-user load and utility increment as follows $$l_i(t, I') = \frac{(1+f) G_{dv} G_a s_i(t, I')}{1 + (1+f-\phi) G_{dv} G_a s_i(t, I')},$$

$$u_i(t, I') = \frac{w_i(t)}{B_i(t)^\alpha} W \log_2(1 + s_i(t, I));$$

viii) calculating $$L(t) = 1 - \frac{1}{(1+\delta)Z_{th}} - \sum_{\forall i \in I'(t)} l_i(t, I');$$

If $L(t) < 0$ or $$\sum_{\forall i \in I'(t)} u_i(t, I') < \sum_{\forall i \in I(t)} u_i(t, I),$$

and if U≠NULL, then going back to step iv);
ix) adding k to I(t): $I(t)=I'(t)$, $L^*(t)=L(t)$; If U=NULL, stop with scheduling decision as $\{p_i(t)=\overline{p}_i^{max} 1_{(i \in I(t))}, \forall i \in K\}$; otherwise, going back to Step iv).

4. A method comprising the steps of:
constraining total power received from cellular users accessing a base station through any one of a TDMA access, CDMA access, and a derivation of a TDMA/CDMA access, and
scheduling users for access to the base station within the constrained total power in response to an optimization that for each time slot determines a group of time critical cellular users and their transmission power factoring in instantaneous location-dependent channel states and long term quality of service performance, wherein the optimization includes at least one of:
iterating a solution to an NP-hard Knapsak problem with initialization of maximum transmit power per cellular user inversely proportional to at least one of an activity factor of a cellular user's channel ($G_{dv}$), the cellular user's antenna gain ($G_a$), the instantaneous channel gain of a dedicated uplink channel for the cellular user ($h_i(t)$, and other-cellular user to same-cellular user interference ratio (f), and directly proportional to total resource power consumption ($L^*(t)$);
for backlogged cellular users, defining the load per cellular user to be directly proportional to an activity factor of a cellular user's channel ($G_{dv}$), the cellular user's antenna gain ($G_a$), the instantaneous channel gain of a dedicated uplink channel for the cellular user ($h_i(t)$, optimal assignment of power allocation or all cellular users ($p_i^{-max}$), other-cellular user to same-cellular user interference ratio (f), and inversely proportional to total received power by the base station ($N_0 W$); and
estimating the per-user load $l_i(t)$ as the ratio of maximum received power from cellular user i, if supposing the cellular user i is transmitting at its full power, to the maximum allowed total interference, (i.e., $N_i(t)W = N_0 W Z_{th}$), estimating per-cellular user utility increment ($u_i^{RoT}(T)$) with total received power at the base station ($N_i(t)W = N_0 W Z_{th}$, i.e.), assuming each cellular user is facing the maximum allowable interference and estimating each backlogged user load $l_i(t)$ based on an existing interference with only active cellular users.

\* \* \* \* \*